(12) United States Patent
Kurosawa

(10) Patent No.: US 7,805,273 B2
(45) Date of Patent: Sep. 28, 2010

(54) WAVEFORM GENERATOR, WAVEFORM GENERATION APPARATUS, TEST APPARATUS AND COMPUTER READABLE MEDIUM

(75) Inventor: Makoto Kurosawa, Tokyo (JP)

(73) Assignee: Advantest Corporation, Tokyo (JP)

( * ) Notice: Subject to any disclaimer, the term of this patent is extended or adjusted under 35 U.S.C. 154(b) by 112 days.

(21) Appl. No.: 12/176,429

(22) Filed: Jul. 21, 2008

(65) Prior Publication Data

US 2009/0204357 A1 Aug. 13, 2009

(30) Foreign Application Priority Data

Jul. 24, 2007 (JP) ............................. 2007-192008

(51) Int. Cl.
*G01R 35/02* (2006.01)
(52) U.S. Cl. ..................................... 702/106
(58) Field of Classification Search .................. 702/57, 702/66, 67, 72–75, 106, 107, 110, 118–120, 702/124, 126, 176, 189, 198; 332/100; 375/280, 375/308, 324
See application file for complete search history.

(56) References Cited

U.S. PATENT DOCUMENTS 4,206,424 A * 6/1980 Nossen ....................... 332/104
5,121,412 A * 6/1992 Borth ......................... 375/308
5,420,887 A * 5/1995 Rhodes et al. ............... 375/295

FOREIGN PATENT DOCUMENTS

JP 2001-223585 8/2001

\* cited by examiner

*Primary Examiner*—Mohamed Charioui
(74) *Attorney, Agent, or Firm*—Osha • Liang LLP

(57) ABSTRACT

Provided is a waveform generating apparatus that generates analog signal based on fundamental waveform data including a predetermined number of samples, including: phase difference calculating section that calculates phase difference between the initial phase and final phase of a signal resulting from FSK-modulating, based on first set of modulation frequencies, input data sequence to be modulated onto a signal that the waveform generating apparatus generates; frequency calculating section that calculates correction frequency corresponding to quotient of dividing, by the predetermined number of samples, residue of dividing the phase difference by $2\pi$; waveform producing section that produces fundamental waveform data representing a waveform corresponding to a signal resulting from FSK-modulating the input data sequence based on second set of modulation frequencies obtained by subtracting the correction frequency from the modulation frequencies in the first set; and output section that outputs a signal repeating the waveform represented by the fundamental waveform data.

7 Claims, 15 Drawing Sheets

FIG. 4A  INPUT DATA SEQUENCE   0   1   0  ···  0

FIG. 6A  INPUT DATA SEQUENCE    0  1  0  0  ...  1  0  1  1

WAVEFORM GENERATOR, WAVEFORM GENERATION APPARATUS, TEST APPARATUS AND COMPUTER READABLE MEDIUM

CROSS REFERENCE TO RELATED APPLICATIONS

The present application claims priority from Japanese Patent Application No. 2007-192008 filed on Jul. 24, 2007, the contents of which are incorporated herein by reference.

BACKGROUND

1. Technical Field

The present invention relates to a waveform generating apparatus, a waveform producing apparatus, a test apparatus, and a computer readable medium. Particularly, the present invention relates to a waveform generating apparatus that generates an analog signal, a waveform producing apparatus, a test apparatus, and a computer readable medium.

2. Related Art

A waveform generating apparatus reads out waveform data that represents an arbitrary waveform from a waveform memory. The waveform generating apparatus converts the read waveform data from digital to analog, and outputs a signal having the arbitrary waveform. See, e.g., Patent Literature 1: Japanese Patent Application Publication No. 2001-223585. The waveform generating apparatus can output a signal that repeats the arbitrary waveform, by repeatedly converting the waveform data from digital to analog.

The waveform generating apparatus might output a signal including spurious when repeatedly outputting the arbitrary waveform, if the end portion and start portion of the arbitrary waveform are discontinuous. For example, if the initial phase and final phase of the arbitrary waveform are different, the waveform generating apparatus will output a signal including spurious when repeatedly outputting the arbitrary waveform resulting from FSK-modulated arbitrary data.

SUMMARY

Hence, it is an object of an aspect of the innovations included herein to provide a waveform generating apparatus, a waveform producing apparatus, a test apparatus, and a computer readable medium that can overcome the above problem. The above and other objects can be achieved by combinations described in the independent claims. The dependent claims define further advantageous and exemplary combinations of the innovations herein.

To overcome the above problem, according to one exemplary waveform generating apparatus according to an aspect related to the innovations herein, provided is a waveform generating apparatus that generates an analog signal based on fundamental waveform data including a predetermined number of samples, including: a phase difference calculating section that calculates a phase difference between an initial phase and a final phase of a signal resulting from FSK-modulating, based on a predetermined first set of modulation frequencies, an input data sequence that is to be modulated onto a signal that the waveform generating apparatus generates; a frequency calculating section that calculates a correction frequency corresponding to a value of dividing, by the predetermined number of samples, a residue of dividing the phase difference by $2\pi$; a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set; and an output section that outputs a signal repeating the waveform represented by the fundamental waveform data.

According to one exemplary waveform producing apparatus according to an aspect related to the innovations herein, provided is a waveform producing apparatus that produces fundamental waveform data that includes a predetermined number of samples, and that is a source of an analog signal to be generated by a waveform generating apparatus, the waveform producing apparatus including: a phase difference calculating section that calculates a phase difference between an initial phase and a final phase of a signal resulting from FSK-modulating, based on a predetermined first set of modulation frequencies, an input data sequence to be modulated onto a signal that the waveform generating apparatus generates; a frequency calculating section that calculates a correction frequency corresponding to a value of dividing, by the predetermined number of samples, a residue of dividing the phase difference by $2\pi$; and a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set.

According to one exemplary test apparatus according to an aspect related to the innovations herein, provided is a test apparatus that tests a device under test by supplying the device under test with a test signal generated based on fundamental waveform data including a predetermined number of samples, including: a phase difference calculating section that calculates a phase difference between an initial phase and a final phase of a signal resulting from FSK-modulating, based on a predetermined first set of modulation frequencies, an input data sequence that is to be modulated onto a signal supplied to the device under test; a frequency calculating section that calculates a correction frequency corresponding to a value of dividing, by the predetermined number of samples, a residue of dividing the phase difference by $2\pi$; a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set; an output section that outputs the test signal repeating the waveform represented by the fundamental waveform data; and a measuring section that measures a characteristic of the device under test based on an output signal output by the device under test in response to the test signal.

According to one exemplary computer readable medium according to an aspect related to the innovations herein, provided is a computer readable medium storing a program that controls an information processing apparatus to function as a waveform producing apparatus that produces fundamental waveform data that includes a predetermined number of samples and that is a source of an analog signal that a waveform generating apparatus generates, the program, when executed by the information processing apparatus, controlling the information processing apparatus to function as: a phase difference calculating section that calculates a phase difference between an initial phase and a final phase of a signal resulting from FSK-modulating, based on a predetermined first set of modulation frequencies, an input data sequence to be modulated onto a signal that the waveform generating apparatus generates; a frequency calculating section that calculates a correction frequency corresponding to a value of dividing, by the predetermined number of samples, a residue of dividing the phase difference by $2\pi$; and a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set.

The summary clause does not necessarily describe all necessary features of the embodiments of the present invention. The present invention may also be a sub-combination of the features described above.

BRIEF DESCRIPTION OF THE DRAWINGS

FIG. 4A shows an example of a signal in the phase difference calculating section 26, when the phase difference calculating section 26 produces fundamental waveform data representing a waveform corresponding to a signal resulting from 2-frequency FSK modulation.

FIG. 6A shows an example of a signal in the waveform producing section 30, when the waveform producing section 30 produces fundamental waveform data representing a waveform corresponding to a signal resulting from 2-frequency FSK modulation.

DESCRIPTION OF EXEMPLARY EMBODIMENTS

An aspect of the present invention will be explained below by way of embodiments, which do not intent to limit the present invention recited in the claims. All the combinations of features described in the embodiments are not necessarily essential to the innovations herein.

Figure 1:
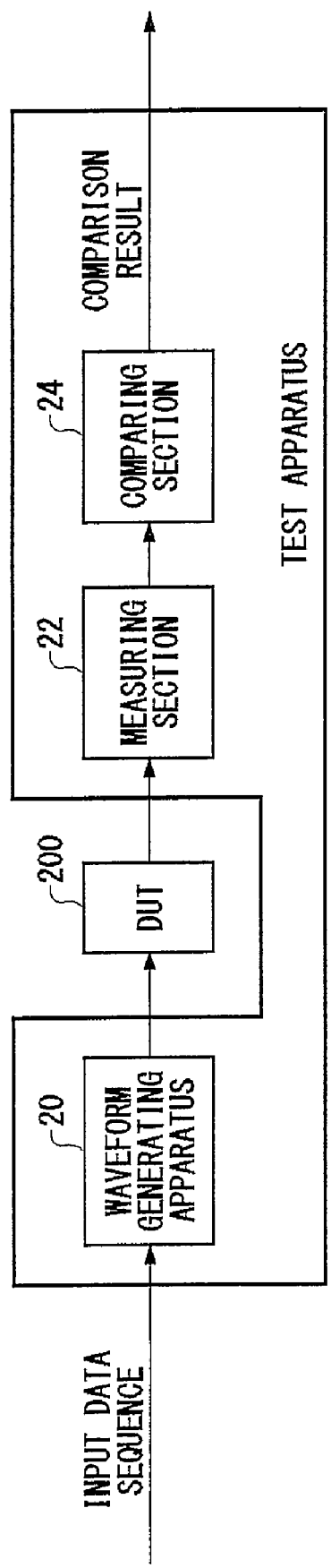
FIG. 1 shows the configuration of a test apparatus 10 according to the present embodiment, together with a DUT 200.

FIG. 1 shows the configuration of a test apparatus 10 according to the present embodiment, together with a device under test (DUT) 200. The test apparatus 10 tests the DUT 200. The DUT 200 may be, for example, an amplifier, a modulator, a demodulator, or the like used in a communication device for a global system for mobile communications (GSM) or the like.

The test apparatus 10 includes a waveform generating apparatus 20, a measuring section 22, and a comparing section 24. The waveform generating apparatus 20 generates an analog signal from fundamental waveform data including a predetermined number of samples. To be more specific, the waveform generating apparatus 20 generates fundamental waveform data including the predetermined number of samples based on an input data sequence input from the outside, and generates an analog signal that repeats a waveform represented by the fundamental waveform data, as a test signal. The waveform generating apparatus 20 supplies the generated test signal to the DUT 200. According to the present embodiment, the waveform generating apparatus 20 modulates the generated test signal onto a carrier signal having a predetermined carrier frequency, when supplying the test signal to the DUT 200.

The measuring section 22 receives an output signal which the DUT 200 outputs in response to the supplied test signal. The measuring section 22 measures a characteristic of the DUT 200 based on the received output signal. The measuring section 22 may measure, for example, the electricity of the output signal output by the DUT 200 at each frequency of the signal, i.e., the spectrum characteristic of the signal. Instead of this or in addition to this, the measuring section 22 may measure, for example, leakage electricity to an adjacent frequency channel of the DUT 200, or may measure the electricity at each frequency within a target range of frequencies to be measured, with the frequencies that are not within the target range masked.

The comparing section 24 compares the result of measurement by the measuring section 22 with an expectation value to judge whether the DUT 200 is defective or not. For example, the comparing section 24 may compare the result of measurement by the measuring section 22 with the expectation value to classify the DUT 200 into any class. Such a test apparatus 10 can supply the DUT 200 with a test signal that repeats the waveform represented by the fundamental waveform data, and can measure the characteristic of the DUT 200 based on the output signal output by the DUT 200 in response to the supplied test signal.

Figure 2:
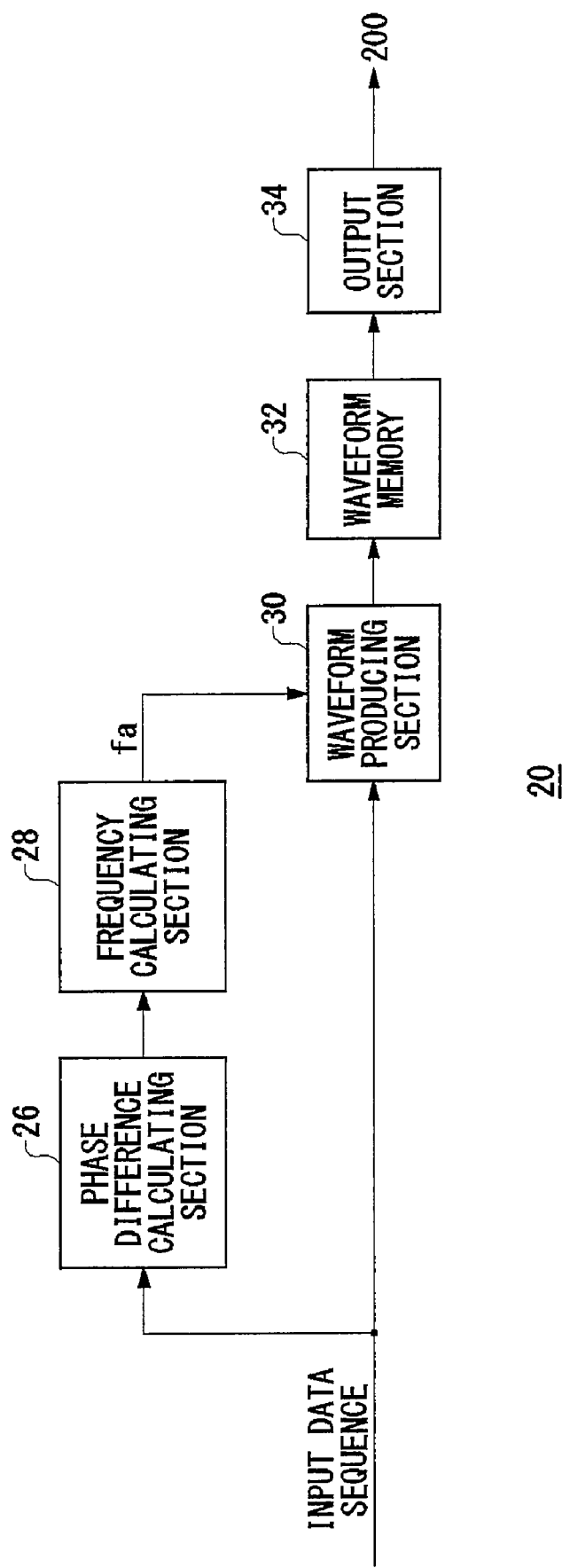
FIG. 2 shows the configuration of a waveform generating apparatus 20 according to the present embodiment.

FIG. 2 shows the configuration of the waveform generating apparatus 20 according to the present embodiment. The waveform generating apparatus 20 includes a phase difference calculating section 26, a frequency calculating section 28, a waveform producing section 30, a waveform memory 32, and an output section 34.

The phase difference calculating section 26 receives, from, for example, the outside, an input data sequence that is to be modulated onto a signal that the waveform generating apparatus 20 generates, i.e., an input data sequence that is to be modulated onto the signal to be supplied to the DUT 200. The phase difference calculating section 26 calculates the phase difference between the initial phase and final phase of a signal, resulting from the input data sequence being modulated by frequency shift keying (FSK) scheme based on a first set of modulation frequencies. FSK modulation here makes the phases of adjacent symbols continuous. For example, the phase difference calculating section 26 may calculate the phase difference between the initial phase and final phase of a signal resulting from 2-frequency FSK modulation based on frequencies f and −f, which are expressed by the following equations (1) and (2).

$$f = R \times 0.5 \times h \quad (1)$$

$$-f = -R \times 0.5 \times h \quad (2)$$

In the equations (1) and (2), R indicates symbol rate. That is, R indicates the symbol frequency of the data sequence included in the signal to be generated by the waveform generating apparatus 20. h indicates modulation index.

The frequency calculating section 28 calculates a value of dividing by the predetermined number of samples, a residue of dividing by $2\pi$ the phase difference calculated by the phase difference calculating section 26. That is, the frequency calculating section 28 calculates a value by dividing, by the number of samples in the fundamental waveform data, the remainder of dividing by $2\pi$ the phase difference calculated by the phase difference calculating section 26. Here, the value calculated by the frequency calculating section 28 is the average phase difference.

The frequency calculating section 28 calculates a correction frequency $f_a$ corresponding to the calculated value, i.e., corresponding to the average phase difference. That is, the frequency calculating section 28 calculates, as the correction frequency $f_a$, a frequency that will cause each sampling cycle of the fundamental waveform data to be phase-shifted by an amount equal to the calculated value, i.e., the average phase difference.

The waveform producing section 30 receives the input data sequence as an input. The waveform producing section 30 produces fundamental waveform data that represents a waveform that corresponds to a signal resulting from FSK-modulating the input data sequence based on a second set of modulation frequencies obtained by subtracting the correction frequency from the modulation frequencies in the first set. That is, the waveform producing section 30 produces fundamental waveform data that represents a waveform corresponding to a signal resulting from FSK-modulating the input data sequence based on the second set of modulation frequencies obtained by subtracting the correction frequency from each of the plurality of frequencies included in the predetermined first set of modulation frequencies. For example, when the first set of modulation frequencies includes the frequencies f and −f, the second set of modulation frequencies includes frequencies $f-f_a$ and $-f-f_a$.

The waveform memory 32 stores the fundamental waveform data produced by the waveform producing section 30. The output section 34 reads out the fundamental waveform data stored in the waveform memory 32, converts the data, for example, from digital to analog, thereby generating a test signal that repeats the waveform represented by the fundamental waveform data. The output section 34 outputs the test signal to the DUT 200. According to the present embodiment, the output section 34 modulates the test signal onto a carrier signal having a predetermined carrier frequency, and outputs the test signal to the DUT 200.

In order that the initial phase and final phase of the FSK-modulated signal will be continuous, the initial phase and final phase of the FSK-modulated signal have to coincide with each other. In order that the initial phase and final phase of the FSK-modulated signal will coincide with each other, the following equation (3) has to be satisfied.

[Formula 1]

$$\sum_{n=0}^{N-1} f_r(n) + \text{Phase}(0) = 2\pi k + \text{Phase}(0) \quad (3)$$

In the equation (3), $f_r(n)$ indicates the frequency of each symbol in the FSK-modulated signal, n indicates symbol number, N indicates the number of samples in the FSK-modulated signal, Phase(0) indicates the initial phase of the FSK-modulated signal, and k indicates any integer.

Next, a frequency shifting to be made on the FSK-modulated signal while it is in its baseband will be considered. A signal obtained by frequency-shifting the FSK-modulated signal in its baseband by an amount equal to the frequency $f_a$ is represented by a subtraction of $f_a$ from $f_r(n)$. Hence, in order that the initial phase and final phase of the signal obtained by frequency-shifting the FSK-modulated signal in its baseband by the amount equal to the frequency $f_a$ will coincide with each other, the following equation (4) has to be satisfied.

[Formula 2]

$$\sum_{n=0}^{N-1} \{f_r(n) - f_a\} + \text{Phase}(0) = 2\pi k + \text{Phase}(0) \quad (4)$$

When the equation (4) is satisfied, the frequency $f_a$ that indicates the shift amount is represented by the following equation (5).

[Formula 3]

$$f_a = \frac{\left\{\sum_{n=0}^{N-1} f_r(n) - 2\pi k\right\}}{N} \quad (5)$$

The following expression (6) is equal to the remainder of dividing by $2\pi$ the accumulative value of $f_r(n)$, where the accumulative value is the total sum of $f_r(0)$ to $f_r(N-1)$. That is, the expression (6) is equal to the residue of dividing by $2\pi$ the accumulative value of $f_r(n)$.

[Formula 4]

$$\left\{\sum_{n=0}^{N-1} f_r(n) - 2\pi k\right\} \quad (6)$$

In view of this, the equation (5) above can be transformed into the following equation (7).

[Formula 5]

$$-f_a = \frac{\left[\left\{\sum_{n=0}^{N-1} f_r(n) - 2\pi k\right\} \bmod 2\pi\right]}{N} \quad (7)$$

The accumulative value of the frequencies $f_r(n)$ of the symbols in the FSK-modulated signal represents the phase difference between the initial phase and final phase of the FSK-modulated signal. It can be seen from this that the signal obtained by frequency-shifting the FSK-modulated signal in its baseband by the amount equal to the frequency $f_a$ can have its initial phase and final phase coincide, if, as indicated by the equation (7), the frequency $f_a$ that indicates the shift amount takes the value of the value of dividing by the number N of the samples, the residue of dividing by $2\pi$ the phase difference between the initial phase and final phase of the signal that is FSK-modulated based on the first set of modulation frequencies.

Since the waveform producing section 30 produces fundamental waveform data corresponding to the signal resulting from FSK-modulating the input data sequence based on the second set of modulation frequencies obtained by subtracting the correction frequency $f_a$ from the frequencies in the first set, the waveform producing section 30 can produce fundamental waveform data that represents a waveform that corresponds to the FSK-modulated signal resulting from the input data sequence, and in which the initial phase and the final phase are continuous. When modulating onto a carrier signal, a signal, in which the waveform represented by the fundamental waveform data repeats itself, the waveform generating apparatus 20 including the waveform producing section 30 can reduce spurious that might occur at the connection junction between repetitive waveforms, i.e., the connection junction between the end portion and the start portion. The test apparatus 10 including the waveform generating apparatus 20 can attain an accurate measurement of the characteristic of the DUT 200.

The frequency characteristic of the signal resulting from FSK-modulating the input data sequence based on the second set of modulation frequencies is different from that of the signal resulting from FSK-modulating the input data sequence based on the first set of modulation frequencies. Hence, when the waveform generating apparatus 20 outputs a signal resulting from FSK-modulating the input data sequence based on the second set of modulation frequencies, the measuring section 22 will output a measurement result that includes a margin of error due to the difference between the frequency characteristics. However, when the correction frequency $f_a$ is sufficiently small, e.g. when the correction frequency $f_a$ is sufficiently smaller than the frequency pitch in the frequency spectrum analysis, this measurement error will be sufficiently smaller than a measurement error that is caused by spurious. Accordingly, the test apparatus 10 lets the waveform generating apparatus 20 output a signal having a frequency characteristic different from that of the signal originally meant to be output, but can nevertheless achieve a generally accurate measurement of the characteristic of the DUT 200.

The waveform generating apparatus 20 that does not include the waveform memory 32 or the output section 34, i.e., the waveform generating apparatus 20 that includes the phase difference calculating section 26, the frequency calculating section 28, and the waveform producing section 30 functions as an example of the waveform producing apparatus according to the present invention. The waveform generating apparatus according to this example of the present invention can generate fundamental waveform data representing a waveform that corresponds to a signal resulting from FSK-modulating the input data sequence, and in which the initial phase and final phase are continuous.

Figure 3:
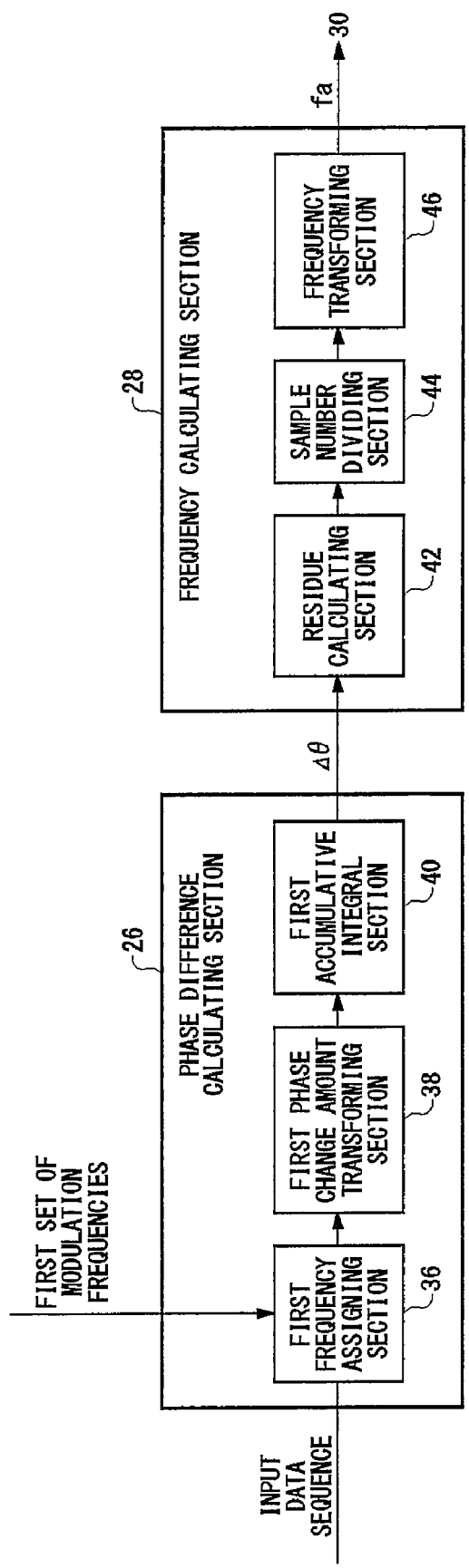
FIG. 3 shows an example configuration of a phase difference calculating section 26 and a frequency calculating section 28.

FIG. 3 shows an example configuration of the phase difference calculating section 26 and the frequency calculating section 28. FIG. 4 show examples of signals in the phase difference calculating section 26 when the phase difference calculating section 26 produces fundamental waveform data representing a waveform that corresponds to a signal resulting from 2-frequency FSK modulation.

For example, the phase difference calculating section 26 may include a first frequency assigning section 36, a first phase change amount transforming section 38, and a first accumulative integral section 40. The first frequency assigning section 36 receives the input data sequence as an input. The first frequency assigning section 36 may, for example, receive a binary input data sequence as shown in FIG. 4A.

Figure 4B:
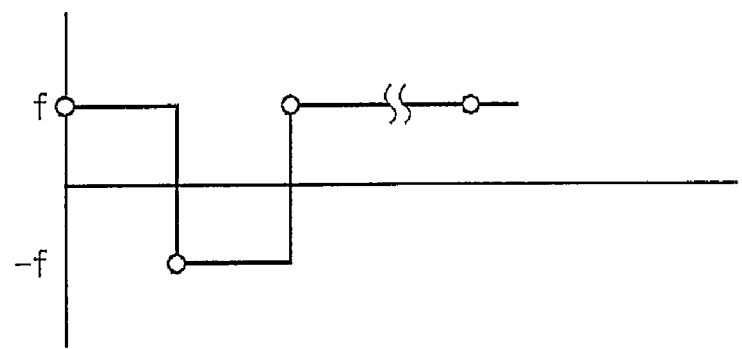
FIG. 4B shows an example of a signal in the phase difference calculating section 26, when the phase difference calculating section 26 produces fundamental waveform data representing a waveform corresponding to a signal resulting from 2-frequency FSK modulation.

The first frequency assigning section 36 transforms each data value in the received input data sequence into a frequency value that is assigned to the data value when the input data sequence is FSK-modulated based on the predetermined first set of modulation frequencies, and outputs the obtained frequency values sequentially. For example, when the first frequency assigning section 36 receives the binary input data sequence shown in FIG. 4A, it may transform a data value 0 to a frequency value that indicates the frequency f while transforming a data value 1 to a frequency value that indicates the frequency −f as shown in FIG. 4B, and may output the obtained frequency values sequentially.

The first phase change amount transforming section 38 transforms the sequence of frequency values output by the first frequency assigning section 36 into a sequence of amounts of phase change. That is, the first phase change amount transforming section 38 multiplies each frequency value by the value of dividing $2\pi$ by the symbol frequency, i.e., multiplies each frequency value by $2\pi$/fsymbol, thereby calculating an amount of phase change. The first phase change amount transforming section 38 outputs the calculated amounts of phase change sequentially. Note that fsymbol indicates the symbol frequency.

Figure 4C:
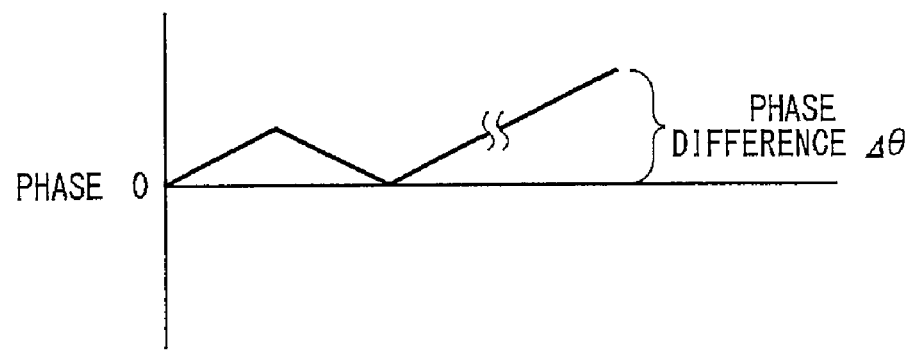
FIG. 4C shows an example of a signal in the phase difference calculating section 26, when the phase difference calculating section 26 produces fundamental waveform data representing a waveform corresponding to a signal resulting from 2-frequency FSK modulation.

The first accumulative integral section 40 transforms the sequence of amounts of phase change output by the first phase change amount transforming section 38, into a sequence of phase values as shown in FIG. 4C. That is, the first accumulative integral section 40 accumulates the amounts of phase change output sequentially in order to calculate the phase at each symbol position. The first accumulative integral section 40 outputs the phase of the last symbol in the obtained sequence of phase values, as the phase difference $\Delta\theta$ between the initial phase and final phase of the signal resulting from FSK modulation based on the first set of modulation frequencies. In this way, the phase difference calculating section 26 can calculate the phase difference $\Delta\theta$ between the initial phase and final phase of the signal resulting from FSK-modulating the input data sequence based on the first set of modulation frequencies.

For example, the frequency calculating section 28 may include a residue calculating section 42, a sample number dividing section 44, and a frequency transforming section 46. The residue calculating section 42 calculates the residue of dividing by $2\pi$ (radian) the phase difference $\Delta\theta$ output by the phase difference calculating section 26. The calculated residue will be hereinafter referred to as residual phase difference $\Delta\theta'$. That is, the residue calculating section 42 derives a value that is smaller than $2\pi$ radian, i.e., a value smaller than 360°, as subtracted from the phase difference $\Delta\theta$ between the initial phase and final phase of the signal resulting from FSK-modulation based on the first set of modulation frequencies.

The sample number dividing section 44 divides the residual phase difference $\Delta\theta'$ calculated by the residue calculating section 42 by the number N of samples of fundamental waveform data that need to be stored in the waveform memory 32. That is, the sample number dividing section 44 calculates an amount to be distributed to each sample from the residual phase difference $\Delta\theta'$. The amount calculated here is the average residual phase difference $\theta_M$.

The frequency transforming section 46 transforms the average residual phase difference $O_M$ into a corresponding frequency value. That is, the frequency transforming section 46 transforms the average residual phase difference $\theta_M$ into a frequency value by multiplying the average residual phase difference $\theta_M$ by a value of dividing the sampling frequency by $2\pi$, i.e., by multiplying the average residual phase difference $\theta_M$ by fs/$2\pi$. The frequency transforming section 46 outputs the obtained frequency value as the correction frequency $f_a$. In this way, the frequency transforming section 46 can calculate the correction frequency $f_a$ that corresponds to the value of dividing by the predetermined number N of samples, the residue of dividing the phase difference $\Delta\theta$ by $2\pi$.

Figure 5:
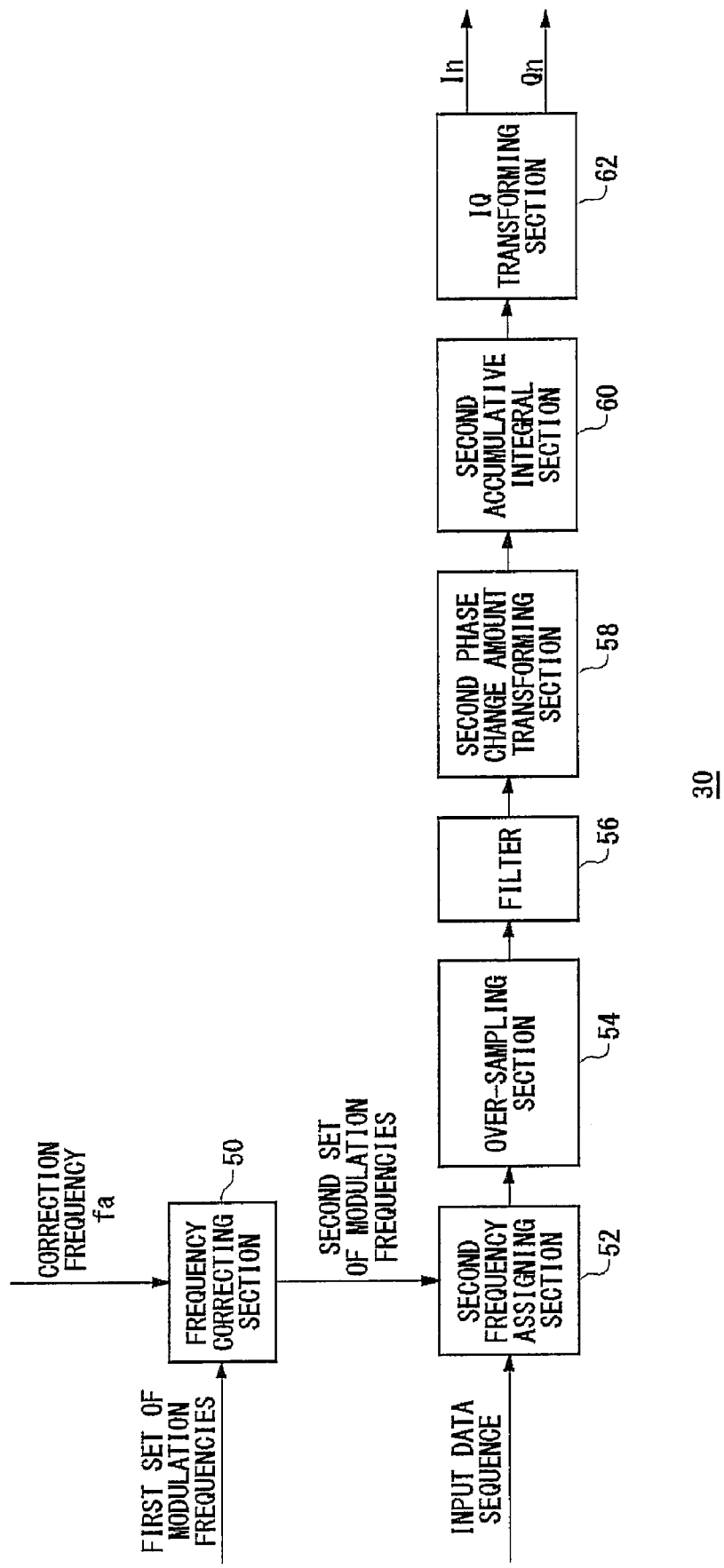
FIG. 5 shows an example configuration of a waveform producing section 30 according to the present embodiment.

FIG. 5 shows an example configuration of the waveform producing section 30 according to the present embodiment. FIG. 6 show examples of signals in the waveform producing section 30 when the waveform producing section 30 produces fundamental waveform data representing a waveform that corresponds to a signal resulting from 2-frequency FSK modulation.

For example, the waveform producing section 30 may include a frequency correcting section 50, a second frequency assigning section 52, an over-sampling section 54, a filter 56, a second phase change amount transforming section 58, a second accumulative integral section 60, and an IQ transforming section 62. The frequency correcting section 50 generates a second set of modulation frequencies by subtracting the correction frequency $f_a$ from the modulation frequencies in the first set. For example, the frequency correcting section 50 may output, as the second set of modulation frequencies, a set of frequencies (f-$f_a$, -f-$f_a$) obtained by subtracting the correction frequency $f_a$ from the frequencies (f, -f) in the first set of modulation frequencies.

The second frequency assigning section 52 receives the input data sequence as an input. For example, the second frequency assigning section 52 may receive a binary input data sequence as shown in FIG. 6A that represents a pseudo random bit sequence (PRBS).

The second frequency assigning section 52 transforms each data value in the received input data sequence into a frequency value that is assigned to the data value when the input data sequence is FSK-modulated based on the second set of modulation frequencies, and outputs the obtained frequency values sequentially. For example, when the second frequency assigning section 52 receives the input data sequence shown in FIG. 6A, it may transform a data value 0 into a frequency value that indicates the frequency f-$f_a$ while transforming a data value 1 into a frequency value that indicates the frequency -f-$f_a$, and may output the transformed frequency values sequentially.

Figure 6B:
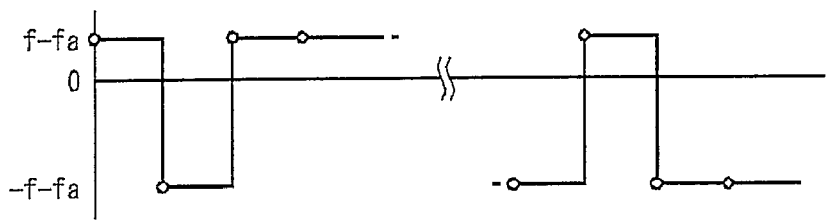
FIG. 6B shows an example of a signal in the waveform producing section 30, when the waveform producing section 30 produces fundamental waveform data representing a waveform corresponding to a signal resulting from 2-frequency FSK modulation.
Figure 6C:
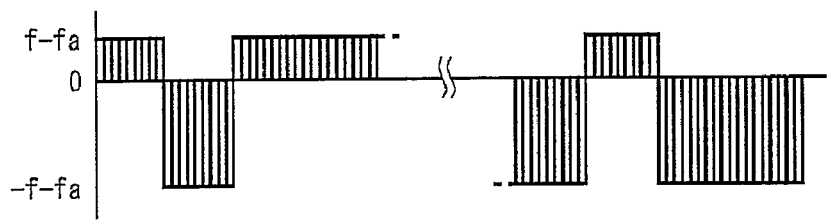
FIG. 6C shows an example of a signal in the waveform producing section 30, when the waveform producing section 30 produces fundamental waveform data representing a waveform corresponding to a signal resulting from 2-frequency FSK modulation.

The over-sampling section 54 over-samples the sequence of frequency values output by the second frequency assigning section 52 at a predetermined over-sampling ratio. That is, the over-sampling section 54 transforms the sequence of frequency values that match the symbol rate, into a sequence of frequency values that match the sampling rate of the fundamental waveform data to be produced. Here, the sampling rate is equal to symbol rate×over-sampling ratio. For example, the over-sampling section 54 may interpolate the sequence of the frequency values f-$f_a$ and -f-$f_a$ shown in FIG. 6B by a zero-order hold filter as shown in FIG. 6C, thereby transforming the sequence of frequency values into a sequence of over-sampled frequency values.

Figure 6D:
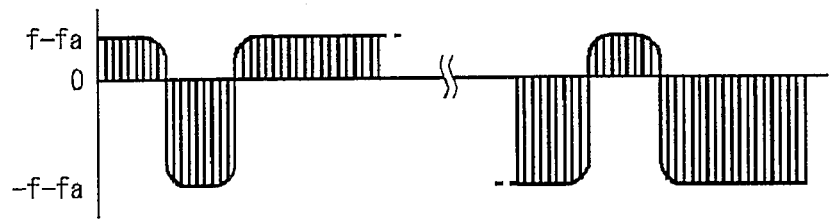
FIG. 6D shows an example of a signal in the waveform producing section 30, when the waveform producing section 30 produces fundamental waveform data representing a waveform corresponding to a signal resulting from 2-frequency FSK modulation.

The filter 56 filters the sequence of over-sampled frequency values output by the over-sampling section 54 by a filter such as a Gaussian filter, an averaging filter, etc. For example, the filter 56 may filter the sequence of over-sampled frequency values f-$f_a$ and -f-$f_a$ shown in FIG. 6C by a Gaussian filter or the like, as shown in FIG. 6D. By this filtering, the filter 56 can reduce spurious that might occur at the boundary between symbols, by smoothing the phase change at the boundary of the symbols.

The filter 56 may further circularly filter the start portion and end portion of the sequence of over-sampled frequency values, by a filter such as a Gaussian filter, an averaging filter, etc. That is, the filter 56 may add the end portion of the sequence of over-sampled frequency values to the front of the start portion of the sequence, and then filter the start portion. The filter 56 may add the start portion of the sequence of over-sampled frequency values to the back of the end portion of the sequence, and then filter the end portion. By doing so, the filter 56 can smooth the phase change from the end portion to the start portion in the sequence of frequency values. The filter 56 can reduce spurious that might occur at the boundary between the repeating cycles, when the signal represented by the fundamental waveform data produced by the waveform producing section 30 is repeatedly output.

The second phase change amount transforming section 58 transforms the sequence of frequency values filtered by the filter 56 into a sequence of amounts of phase change. That is, the second phase change amount transforming section 58 calculates the amount of phase change by multiplying each frequency value by the value of dividing $2\pi$ by the sampling frequency, i.e., by multiplying each frequency value by $2\pi$/fs.

The second phase change amount transforming section 58 sequentially outputs the calculated amounts of phase change.

Figure 6E:
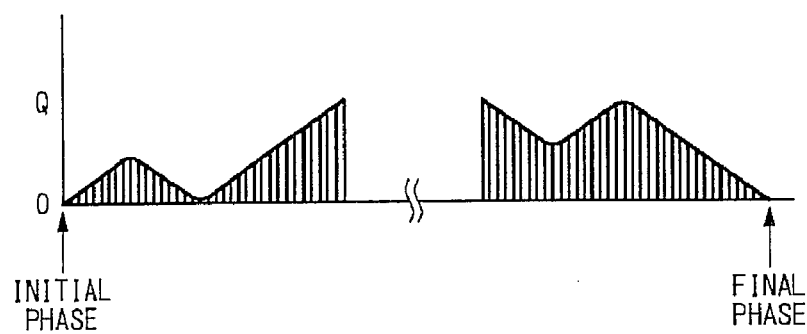
FIG. 6E shows an example of a signal in the waveform producing section 30, when the waveform producing section 30 produces fundamental waveform data representing a waveform corresponding to a signal resulting from 2-frequency FSK modulation.

The second accumulative integral section 60 transforms the sequence of amounts of phase change output by the second phase change amount transforming section 58 into a sequence of phase values. That is, the second accumulative integral section 60 accumulates the amounts of phase change sequentially output in order to calculate the phase at each sample point. For example, the second accumulative integral section 60 may transform the sequence of amounts of phase change into a sequence of values indicating the phase (θ) as shown in FIG. 6E.

Note that the second accumulative integral section 60 produces a sequence of phase values that is based on the signal resulting from FSK-modulating the input data sequence based on the second set of modulation frequencies obtained by subtracting the correction frequency from the modulation frequencies in the first set. Accordingly, in the sequence of phase values produced by the second accumulative integral section 60, the initial value (initial phase) and the final value (final phase) coincide with each other as shown in FIG. 6E.

The IQ transforming section 62 transforms the sequence of phase values output by the second accumulative integral section 60 into a sequence of I components (real components) and a sequence of Q components (imaginary components) on an orthogonal coordinate system. The IQ transforming section 62 writes the obtained sequence of I components and sequence of Q components into the waveform memory 32 as fundamental waveform data.

The waveform producing section 30 with this configuration can produce fundamental waveform data representing a waveform that corresponds to the signal resulting from FSK-modulating the input data sequence and in which the initial phase and the final phase are continuous. In the waveform producing section 30, the filter 56 may be arranged at a stage succeeding the second phase change amount transforming section 58, instead of being arranged at a stage succeeding the over-sampling section 54. Also in this case, the filter 56 can obtain the same effect as that when it is arranged at the stage succeeding the over-sampling section 54.

Figure 7:
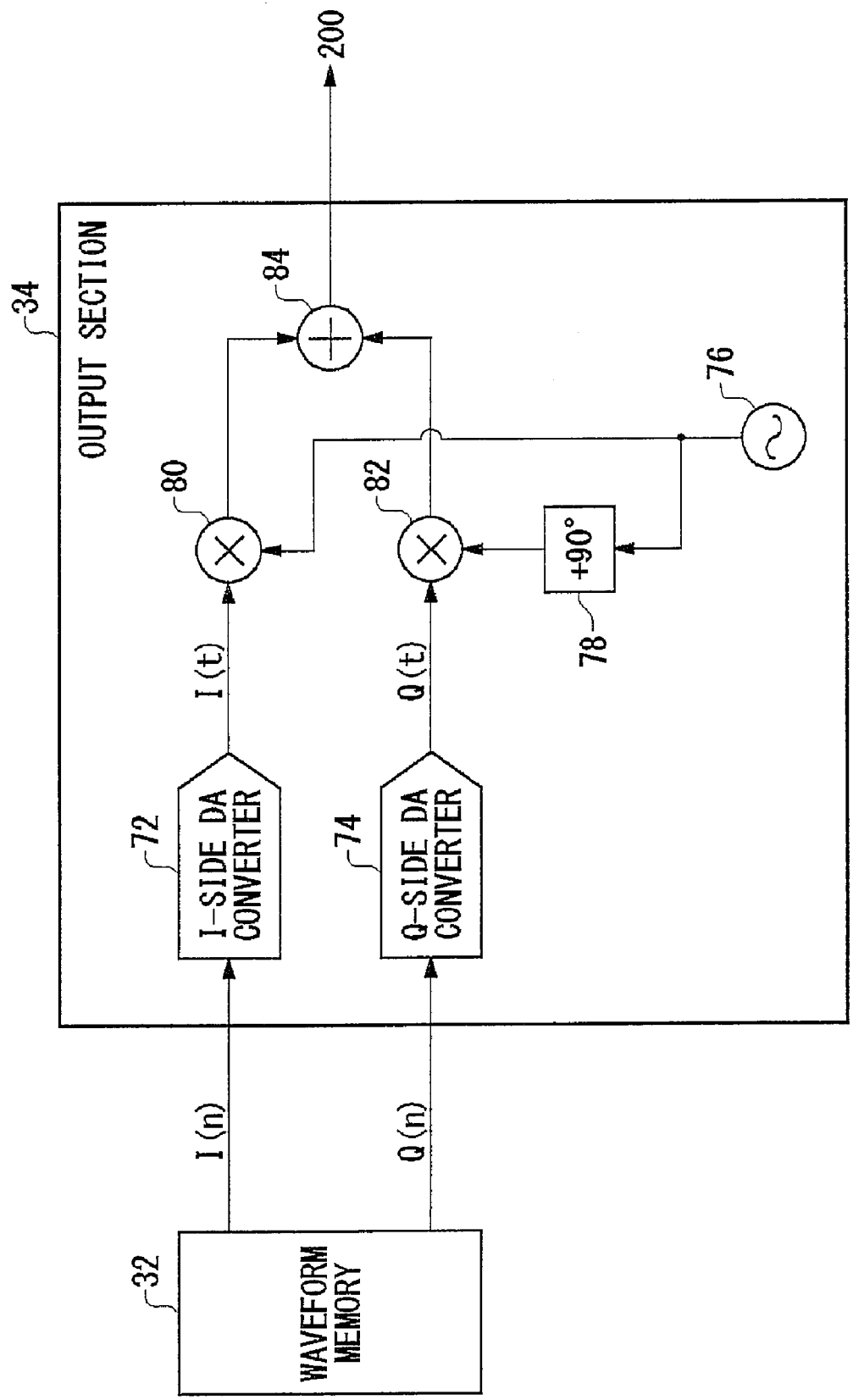
FIG. 7 shows an example configuration of an output section 34, together with a waveform memory 32.

FIG. 7 shows an example configuration of the output section 34, together with the waveform memory 32. For example, the output section 34 may include an I-side DA converter 72, a Q-side DA converter 74, a carrier generator 76, a +90-degree phase shifter 78, an I-side multiplier 80, a Q-side multiplier 82, and an adder 84.

The I-side DA converter 72 sequentially reads out, at the sampling rate, the sequence of I components of the fundamental waveform data stored in the waveform memory 32 and converts it from digital to analog to produce an analog signal. In this case, the I-side DA converter 72 converts the fundamental waveform data from digital to analog repeatedly and continuously. Thereby, the I-side DA converter 72 can produce an analog signal that repeats the waveform represented by the fundamental waveform data. The I-side DA converter 72 outputs the produced analog signal to the I-side multiplier 80.

The Q-side DA converter 74 reads out, at the sampling rate, the sequence of Q components of the fundamental waveform data stored in the waveform memory 32 and converts it from digital to analog to produce an analog signal. In this case, the Q-side DA converter 74 converts the fundamental waveform data from digital to analog repeatedly and continuously. Thereby, the Q-side DA converter 74 can produce an analog signal that repeats the waveform represented by the fundamental waveform data. The Q-side DA converter 74 outputs the produced analog signal to the Q-side multiplier 82.

The carrier generator 76 generates a carrier signal having a predetermined frequency $f_c$. The +90-degree phase shifter 78 shifts the phase of the carrier signal generated by the carrier generator 76 by +90 degrees. The I-side multiplier 80 multiplies the real components (I(t)), output by the I-side DA converter 72, of the signal resulting from FSK-modulating the input data sequence, by the carrier signal generated by the carrier generator 76. The Q-side multiplier 82 multiplies the imaginary components (Q(t)), output by the Q-side DA converter 74, of the signal resulting from FSK-modulating the input data sequence, by the carrier signal generated by the carrier generator 76.

The adder 84 adds the signal resulting from multiplying the real components (I(t)) by the carrier signal to the signal resulting from multiplying the imaginary components (Q(t)) by the carrier signal. The adder 84 outputs the signal resulting from the addition to the DUT 200. In this way, the output section 34 can output a modulation signal of the carrier signal on which a test signal repeating the waveform represented by the fundamental waveform data has been modulated, to the DUT 200.

As an alternative to the above, the output section 34 may include the I-side DA converter 72 and the Q-side DA converter 74. When the DUT 200 is a modulator that modulates a baseband signal onto a carrier signal having a predetermined frequency $f_c$, the output section 34 having this configuration can output a baseband test signal to the DUT 200.

Figure 8:
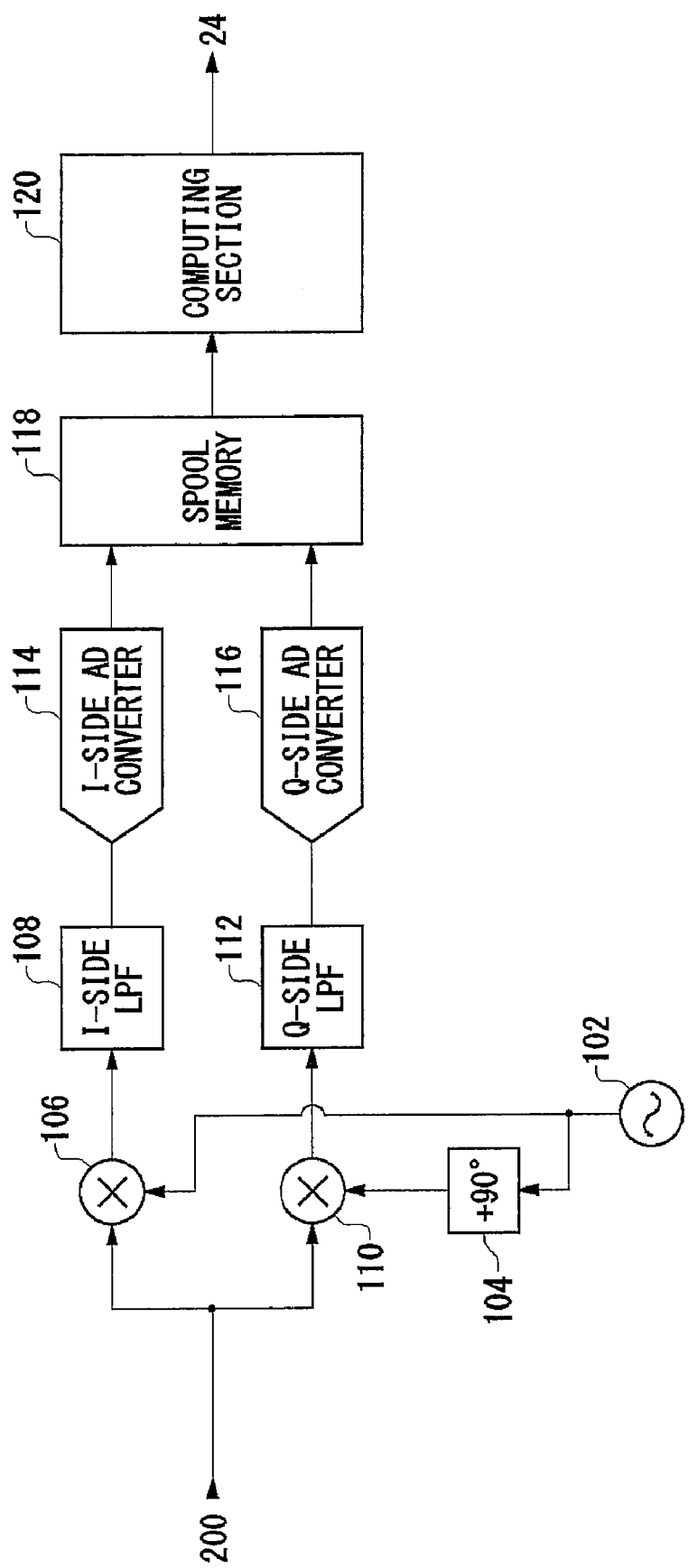
FIG. 8 shows an example configuration of a measuring section 22.

FIG. 8 shows an example configuration of the measuring section 22. For example, the measuring section 22 may include a reference signal generator 102, a +90-degree phase shifter 104, an I-side multiplier 106, an I-side LPF 108, a Q-side multiplier 110, a Q-side LPF 112, an I-side AD converter 114, a Q-side AD converter 116, a spool memory 118, and a computing section 120.

In the present example, the DUT 200 outputs, as its output signal, a modulation signal onto which real components (I'(t)) and imaginary components (Q'(t)) are orthogonally modulated, in response to a supplied test signal. When the DUT 200 is an amplifier, the DUT 200 outputs, as its output signal, an amplified modulation signal resulting from amplifying a modulation signal of a supplied test signal. When the DUT 200 is a modulator, the DUT 200 outputs, as its output signal, a modulation signal resulting from modulating a supplied test signal.

The reference signal generator 102 generates a reference signal having a frequency corresponding to the frequency $f_c$ of the carrier signal of an input modulation signal, e.g., a reference signal having the same frequency as the frequency $f_c$. The +90-degree phase shifter 104 shifts the phase of the reference signal generated by the reference signal generator 102 by +90 degrees. The I-side multiplier 106 multiplies the input modulation signal by the reference signal generated by the reference signal generator 102. The I-side LPF 108 filters the signal resulting from multiplying the reference signal by the modulation signal by a low-pass filter to eliminate a sum frequency component. Consequently, the I-side LPF 108 can output the real components (I'(t)) of the signal orthogonally modulated on the modulation signal.

The Q-side multiplier 110 multiplies the input modulation signal by the reference signal output by the +90-degree phase shifter 104 to have its phase shifted by +90 degrees. The Q-side LPF 112 filters the signal resulting from multiplying the modulation signal by the reference signal whose phase has been shifted by +90 degrees by a low-pass filter to eliminate a sum frequency component. Consequently, the Q-side LPF 112 can output the imaginary components (Q'(t)) of the signal orthogonally modulated on the modulation signal.

The I-side AD converter 114 samples the real components (I'(t)) output by the I-side LPF 108. That is, the I-side AD converter 114 sequentially samples the real components of the output signal at a sampling rate to convert them from analog to digital, and outputs a sequence of digital values (I'(n)) corresponding to the real components of the output signal.

The Q-side AD converter 116 samples the imaginary components (Q'(t)) output by the Q-side LPF 112. That is, the Q-side AD converter 116 sequentially samples the imaginary components of the output signal at a sampling rate to convert them from analog to digital, and outputs a sequence of digital values (Q'(n)) corresponding to the imaginary components of the output signal.

For example, the I-side AD converter 114 and the Q-side AD converter 116 may sample the output signal according to a clock synchronized with the sampling rate of the waveform generating apparatus 20. With this synchronization, the I-side AD converter 114 and the Q-side AD converter 116 can eliminate a clocking error between the transmitter and the receiver.

The spool memory 118 stores the output signal sampled by the I-side AD converter 114 and the Q-side AD converter 116. The computing section 120 calculates characteristics of the DUT 200 based on the sequence of the output signal stored in the spool memory 118. For example, the computing section 120 may calculate the spectrum characteristic of the output signal, leakage electricity to an adjacent frequency channel, and the electricity at each frequency within a target range of frequencies to be measured, with the frequencies that are not within the target range masked.

The computing section 120 outputs the calculation results to the comparing section 24. In this way, the measuring section 22 can measure the characteristics of the DUT 20 based on the output signal output in response to the supplied test signal.

The DUT 200 may output output signals for real components (I'(t)) and for imaginary components (Q'(t)) separately, in response to a supplied test signal. For example, the DUT 200 may be a demodulator that receives a modulation signal on which a test signal is modulated, and outputs, as its output signal, a signal resulting from demodulating the received modulation signal.

In this case, the measuring section 22 may not include the reference signal generator 102, the +90-degree phase shifter 104, the I-side multiplier 106, or the Q-side multiplier 110. In this case, the I-side AD converter 114 samples the real components (I'(t)) of the output signal output by the DUT 200 in response to a supplied test signal. The Q-side AD converter 116 samples the imaginary components (Q'(t)) of the output signal output by the DUT 200 in response to the test signal. Hence, the waveform generating apparatus 20 can be used for measuring characteristics of the DUT 200, even when the DUT 200 is a demodulator or the like.

Figure 9:
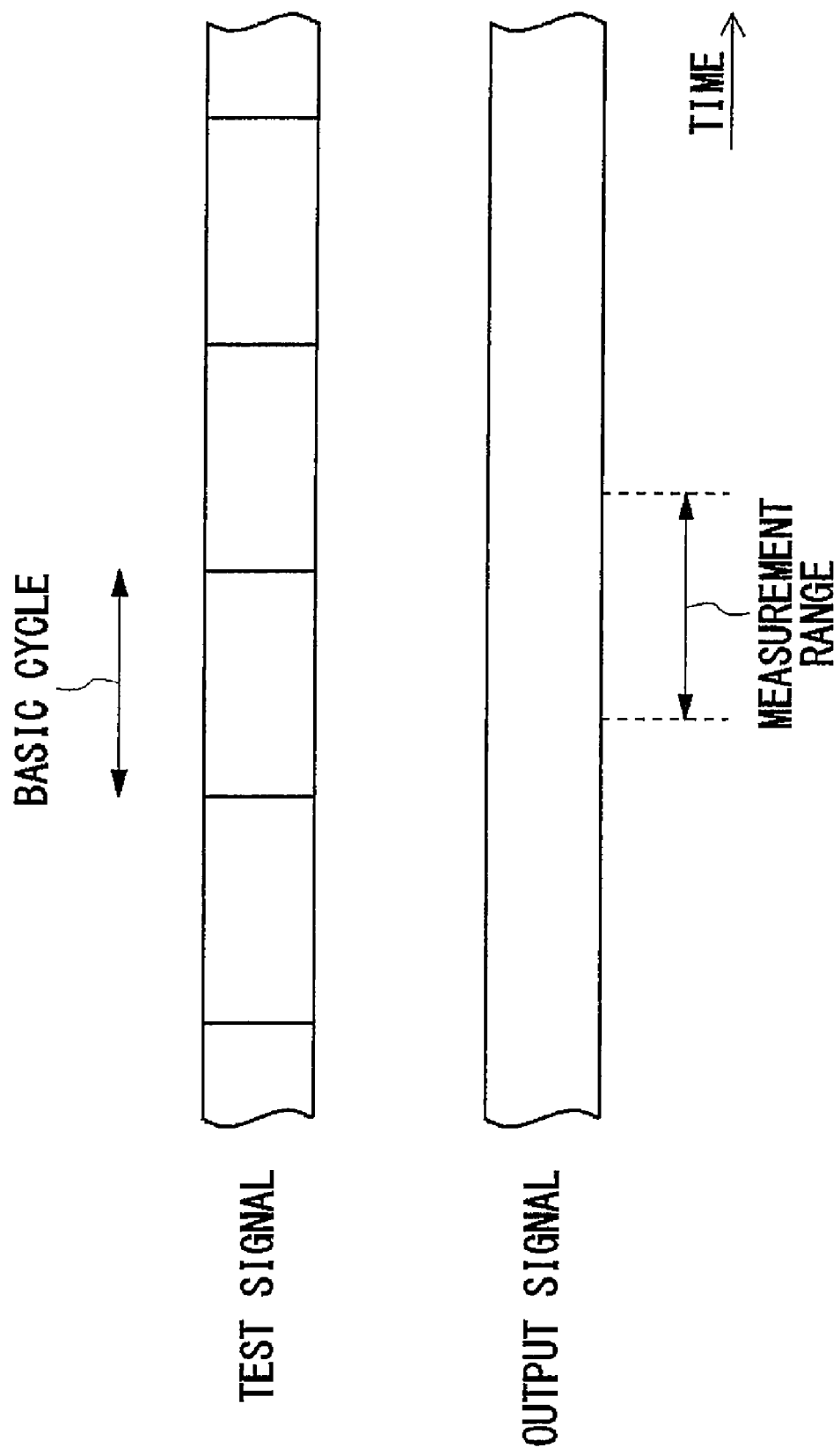
FIG. 9 shows a measurement range of the measuring section 22 according to the present embodiment.

FIG. 9 shows the range of measurement by the measuring section 22 according to the present embodiment. For example, the measuring section 22 may acquire an output signal having a temporal duration corresponding to an integer multiple of the cycle (basic cycle) of the waveform corresponding to the fundamental waveform data, asynchronously with the repeating waveforms of the test signal. The measuring section 22 may measure characteristics of the DUT 200 based on the acquired output signal. For example, when measuring the electricity of the output signal, the measuring section 22 may acquire the output signal having a temporal duration corresponding to an integer multiple of the basic cycle, and may measure the electricity based on the acquired output signal.

Since the test signal output by the waveform generating apparatus 20 has the same waveform in each basic cycle, a signal cut out from the output signal to have the length of the basic cycle or to have the length equal to an integer multiple of the basic cycle will have the same electricity no matter which part of the output signal is cut out. Hence, the measuring section 22 can cut out a signal having a length equal to an integer multiple of the basic cycle from an arbitrary position, and can measure the characteristics, such as the electricity, of the cut-out signal.

For example, when the number of samples in the fundamental waveform data is a power of 2, the measuring section 22 may acquire, from an arbitrary position of the output signal, a part of the output signal that includes the same number of points as the number of samples, or acquire, from an arbitrary position of the output signal, a part of the output signal that includes a number of points that is any other power of 2 than the number of samples in the fundamental waveform data. The measuring section 22 may then perform FFT operation on the acquired output signal to calculate the spectrum.

Hence, the measuring section 22 can measure the electricity or the like of the output signal, without making the output signal synchronous with the repeating cycle of the waveform of the test signal. For example, the measuring section 22 can calculate the spectrum of the output signal without defining a range in the output signal that is subjected to FFT operation. Further, since the operation result will be the same regardless of the position from which the output signal is acquired, the measuring section 22 can calculate the spectrum of the output signal with a high repeatability.

Figure 10:
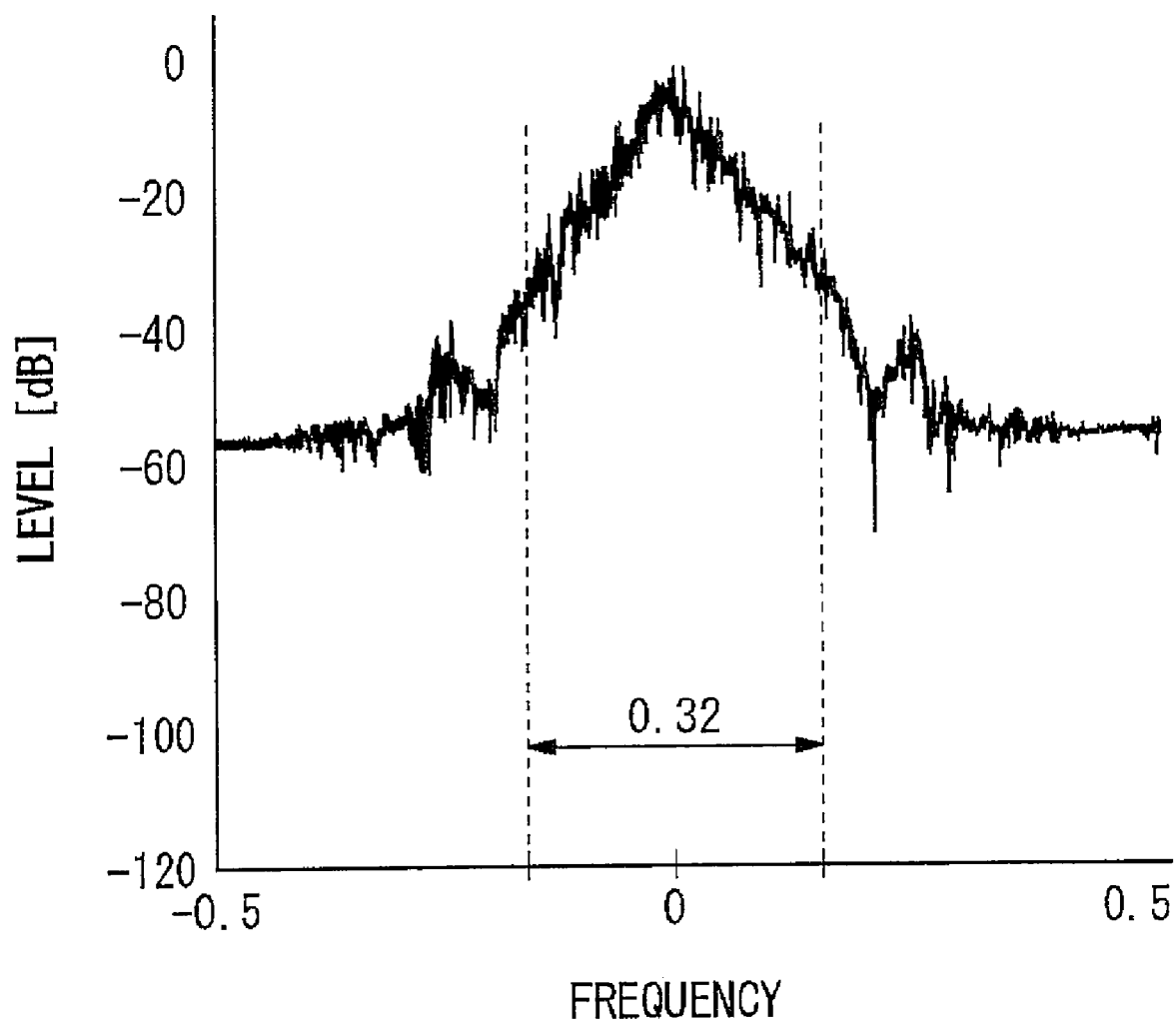
FIG. 10 shows the result of DFT operation on the waveform corresponding to the fundamental waveform data, when the waveform producing section 30 is supplied with PN9 pseudo-random symbols and FSK-modulates them based on a first set of modulation frequencies.
Figure 11:
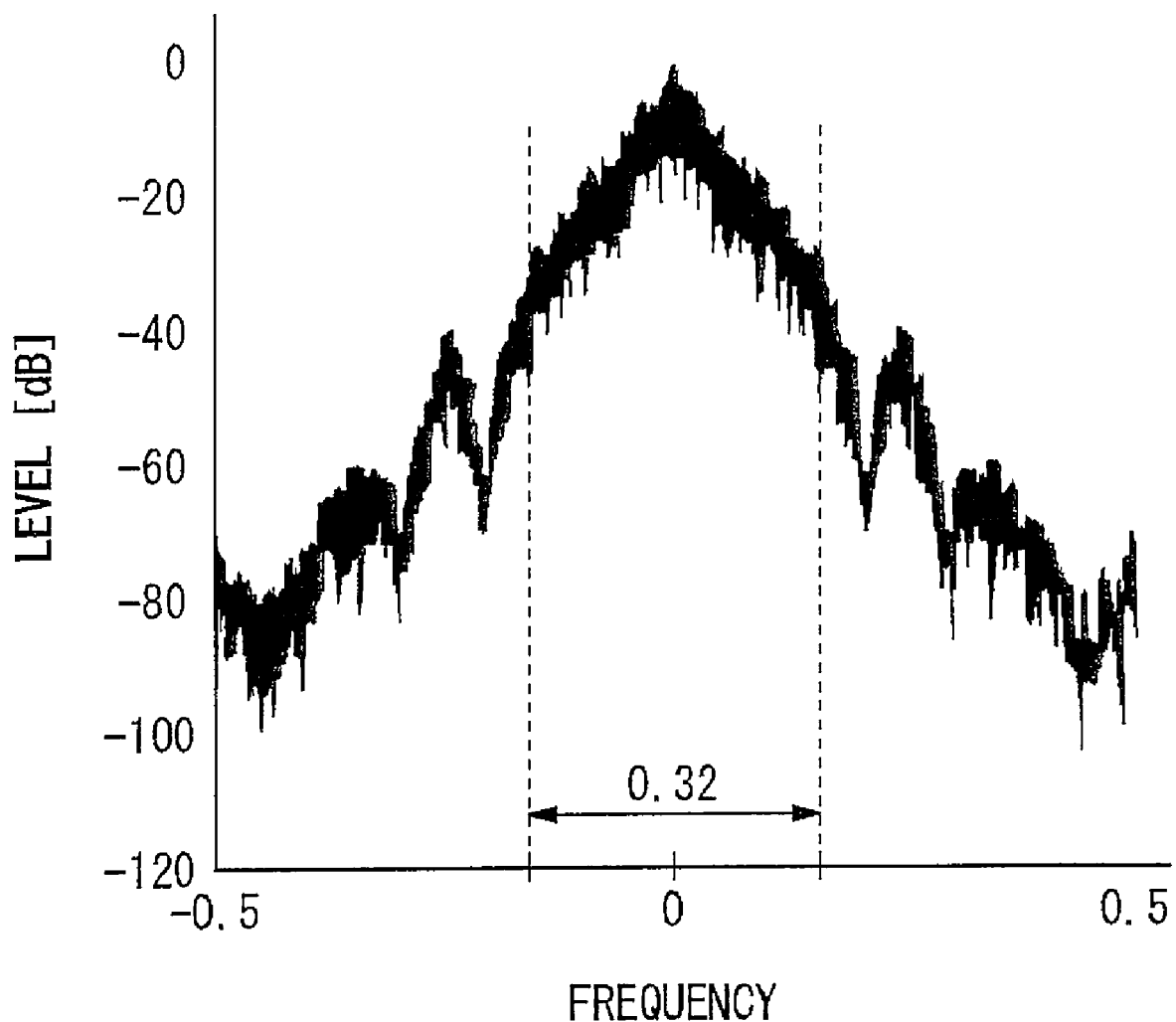
FIG. 11 shows the result of DFT operation on the waveform corresponding to the fundamental waveform data, when the waveform producing section 30 is supplied with PN9 pseudo-random symbols and FSK-modulates them based on a second set of modulation frequencies.

FIG. 10 shows the result of DFT operation on the waveform corresponding to the fundamental waveform data, when the waveform producing section 30 is supplied with PN9 pseudo-random symbols and FSK-modulates the supplied symbols based on the first set of modulation frequencies. FIG. 11 shows the result of DFT operation on the waveform corresponding to the fundamental waveform data, when the waveform producing section 30 is supplied with PN9 pseudo-random symbols and FSK-modulates the supplied symbols based on the second set of modulation frequencies. FIG. 10 and FIG. 11 show the result of DFT operation for 2,044 points, in which the second frequency assigning section 52 uses a modulation index of 0.32, the filter 56 is a Gaussian filter having a BT product of 0.5, and the over-sampling number is 4.

FIG. 10 shows that frequency components equal to or lower than −0.25 and frequency components equal to or higher than 0.25 have a level of −60 dB or higher. As compared with this, FIG. 11 shows that frequency components equal to or lower than −0.25 and frequency components equal to or higher than 0.25 have a level lower than −60 dB. As can be seen from this, the waveform producing section 30 can reduce spurious that is not within the range of frequencies to be FSK-modulated, i.e., the range of −1.6 to +1.6, by FSK-modulating the input data sequence based on the second set of modulation frequencies.

Figure 12:
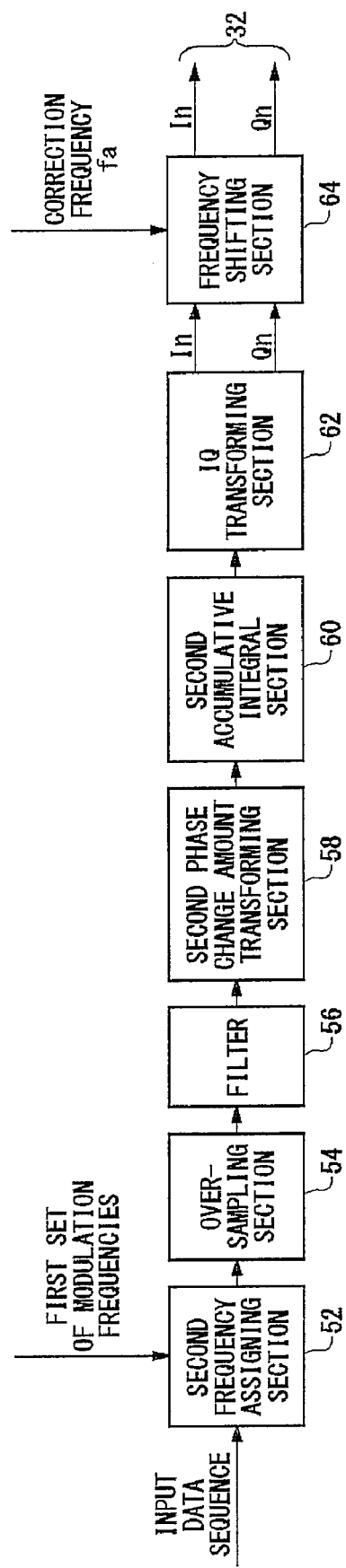
FIG. 12 shows the configuration of the waveform producing section 30 according to the first modification of the present embodiment.

FIG. 12 shows an example configuration of the waveform producing section 30 according to the first modification of the present embodiment. The waveform producing section 30 according to the modification shown in FIG. 12 has generally the same functions and configuration as those of the waveform producing section 30 shown in FIG. 5, so will not be explained again except any difference.

For example, the waveform producing section 30 according to the present modification may include a second frequency assigning section 52, an over-sampling section 54, a filter 56, a second phase change amount transforming section 58, a second accumulative integral section 60, an IQ transforming section 62, and a frequency shifting section 64. The second frequency assigning section 52 transforms each data value in the received input data sequence into a frequency value assigned to the data value when the input data sequence is FSK-modulated based on the first set of modulation frequencies, and sequentially outputs the assigned frequency values. For example, when the second frequency assigning section 52 receives a binary input data sequence, it may transform a data value 0 into a frequency value that indicates the frequency f while transforming a data value 1 into a frequency value that indicates the frequency −f, and may sequentially output the transformed frequency values.

The second accumulative integral section 60 according to the present modification produces a sequence of phase values that is based on the signal resulting from FSK-modulating the input data sequence based on the first set of modulation frequencies. Accordingly, in the sequence of phase values produced by the second accumulative integral section 60, the initial value (initial phase) and the final value (final phase) may not necessarily coincide.

The frequency shifting section 64 negatively shifts the phase of each value in the sequence of I components and sequence of Q components output by the IQ transforming section 62 by an amount determined by the correction frequency $f_a$. That is, the frequency shifting section 64 negatively shifts the center frequency of the signal represented by the sequence of I components and sequence of Q components output by the IQ transforming section 62, by an amount equal to the correction frequency $f_a$. The frequency shifting section 64 writes the frequency-shifted sequence of I components and frequency-shifted sequence of Q components into the waveform memory 32 as fundamental waveform data. The waveform producing section 30 according to the present modification can output the same signal as that output by the waveform producing section 30 shown in FIG. 5.

Figure 13:
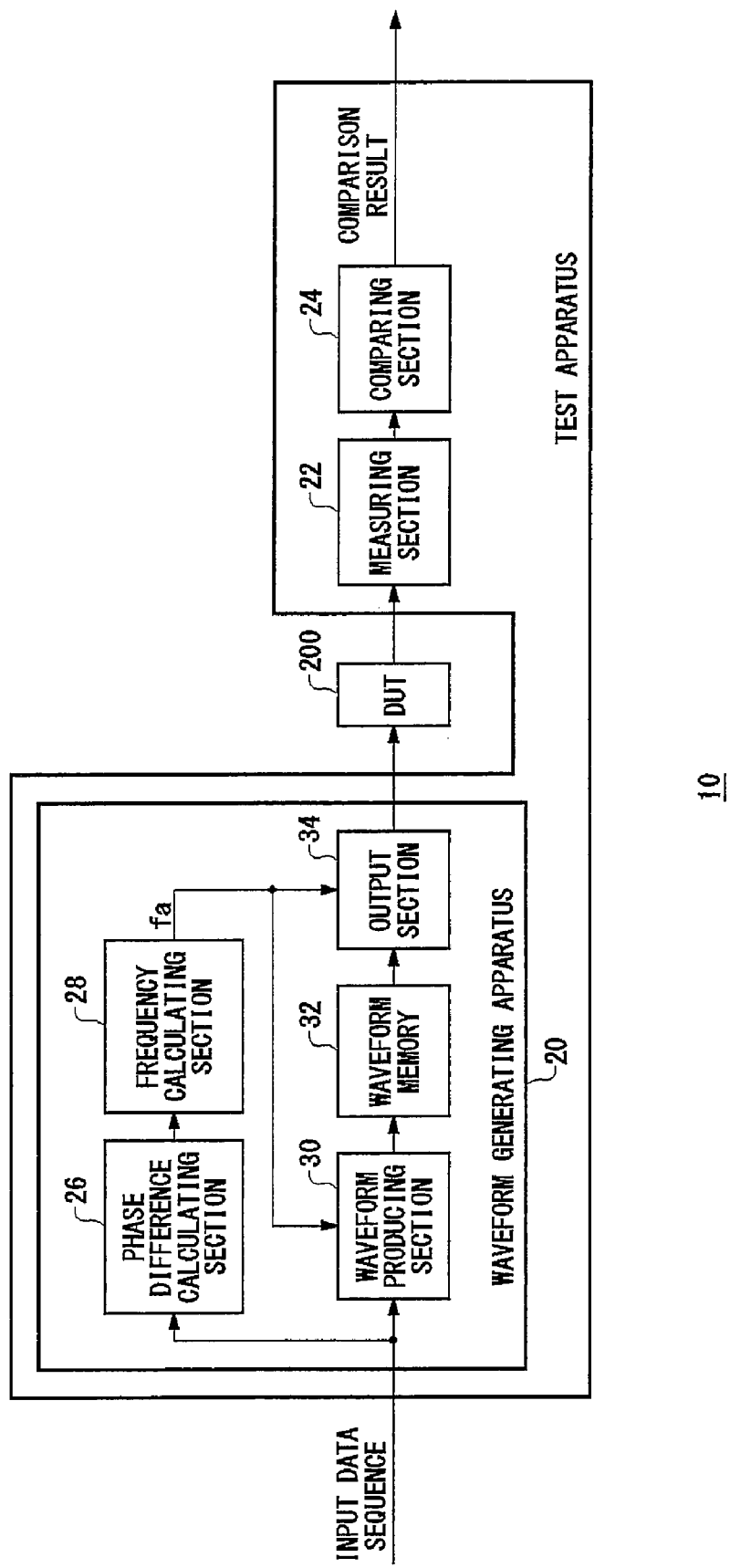
FIG. 13 shows an example configuration of the test apparatus 10 according to the second modification of the present embodiment, together with a DUT 200.

FIG. 13 shows the configuration of the test apparatus 10 according to the second modification of the present embodiment, together with the DUT 200. The test apparatus 10 according to the present modification has generally the same configuration and functions as those of the sections labeled with the same reference numerals shown in FIG. 1, and will not therefore be explained again except any difference.

The frequency calculating section 28 according to the present modification outputs the correction frequency $f_a$ to the waveform producing section 30 and also to the output section 34. The output section 34 outputs a signal repeating the waveform represented by the fundamental waveform data stored in the waveform memory 32, by modulating the signal onto a frequency obtained by adding the correction frequency $f_a$ to a predetermined carrier frequency.

The waveform generating apparatus 20 according to the second modification can modulate, onto a carrier signal, a waveform represented by the fundamental waveform data in which the center frequency is negatively shifted by an amount equal to the correction frequency $f_a$, by bringing the waveform positively back by an amount equal to the correction frequency $f_a$. Accordingly, when using binary FSK modulation and a carrier frequency $f_c$, the waveform generating apparatus 20 according to the second modification can output a modulation signal onto which data are modulated at the positions for frequencies ($f_c$+f) and ($f_c$−f).

Figure 14:
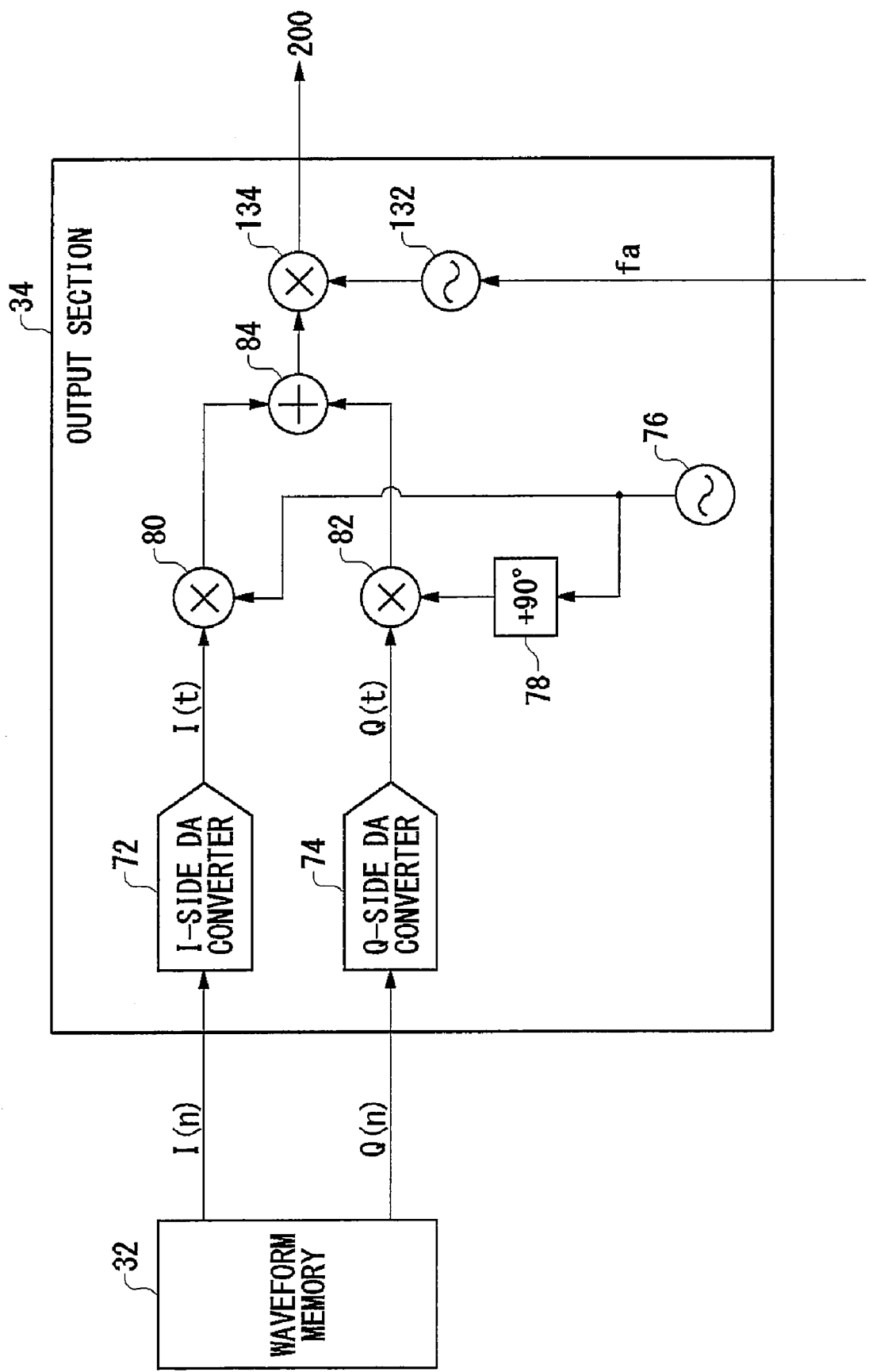
FIG. 14 shows an example configuration of the output section 34 according to the second modification of the present embodiment, together with a waveform memory 32.

FIG. 14 shows an example configuration of the output section 34 according to the second modification of the present embodiment, together with the waveform memory 32. The output section 34 according to the modification shown in FIG. 14 has generally the same configuration and functions as those of the output section 34 shown in FIG. 7, and will not therefore be explained again except any difference.

The output section 34 according to the present modification further includes a correction frequency signal generator 132 and a correction frequency multiplier 134. The correction frequency signal generator 132 generates a correction signal having the correction frequency $f_a$ supplied by the frequency calculating section 28. The correction frequency multiplier 134 multiplies the signal output by the adder 84 by the correction signal output by the correction frequency signal generator 132. As a result, the correction frequency multiplier 134 can output a modulation signal having a center frequency obtained by positively shifting the predetermined carrier frequency $f_c$ by an amount equal to the correction frequency $f_a$. In this way, the output section 34 can output a signal repeating the waveform represented by the fundamental waveform data, by modulating the signal onto a frequency obtained by adding the correction frequency $f_a$ to the predetermined carrier frequency $f_c$.

The output section 34 according to the present modification may include an adjusting section that adjusts the frequency to be output by the carrier generator 76, instead of including the correction frequency signal generator 132 and the correction frequency multiplier 134. The adjusting section causes the carrier generator 76 to generate a frequency obtained by adding the correction frequency $f_a$ to the predetermined carrier frequency $f_c$. With this configuration too, the output section 34 can output a signal repeating the waveform represented by the fundamental waveform data, by modulating the signal onto a frequency obtained by adding the correction frequency $f_a$ to the predetermined carrier frequency $f_c$.

Figure 15:
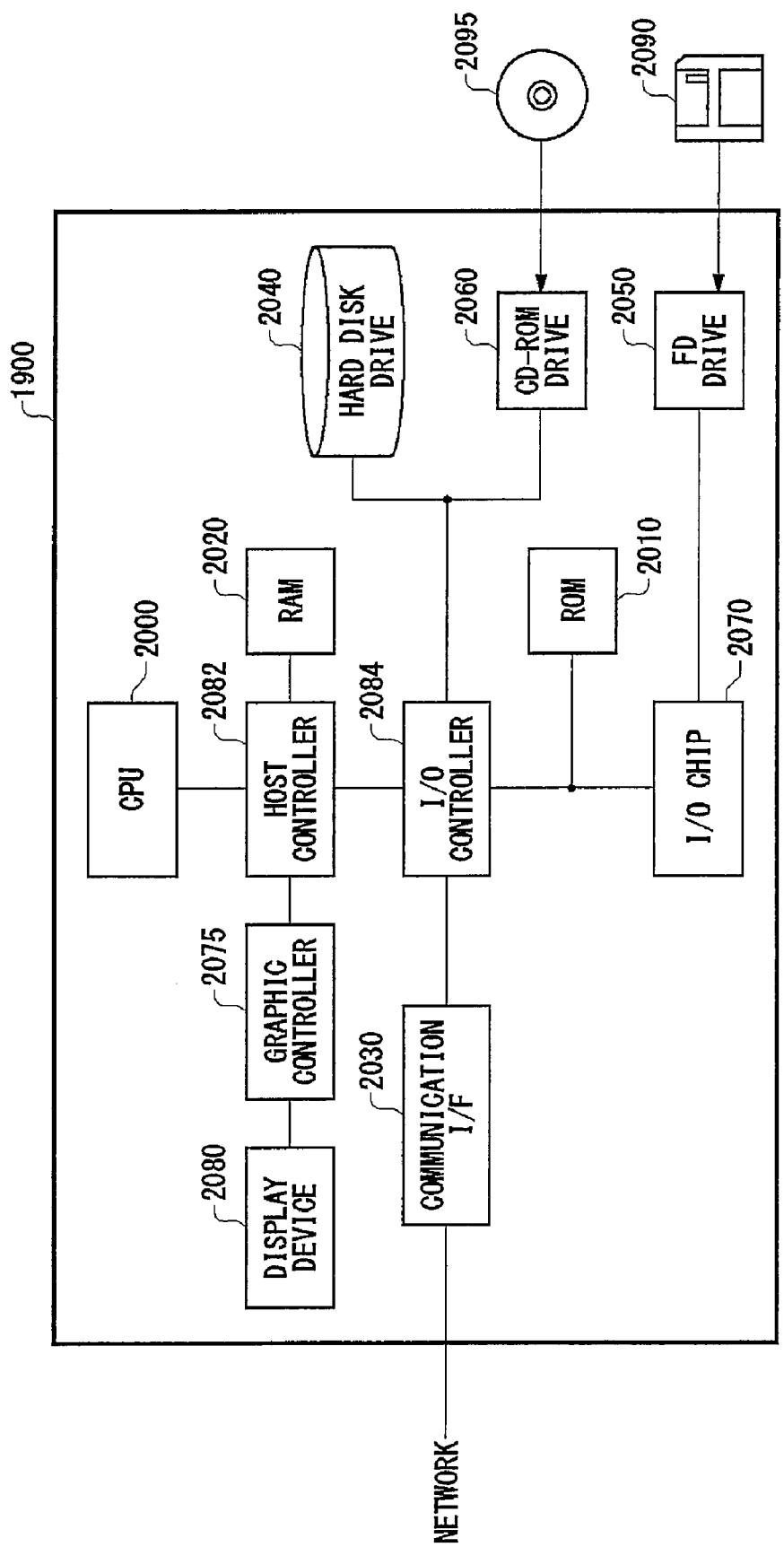
FIG. 15 shows an example hardware configuration of a computer 1900 according to the present embodiment.

FIG. 15 shows an example hardware configuration of a computer 1900 according to the present embodiment. The computer 1900 according to the present embodiment includes a CPU peripheral section, an input/output section, and a legacy input/output section. The CPU peripheral section includes a CPU 2000, a RAM 2020, a graphic controller 2075, and a display device 2080, which are interconnected via a host controller 2082. The input/output section includes a communication interface 2030, a hard disk drive 2040, and a CD-ROM drive 2060, which are connected to the host controller 2082 via an input/output controller 2084. The legacy input/output section includes a ROM 2010, a flexible disk drive 2050, and an input/output chip 2070, which are connected to the input/output controller 2084.

The host controller 2082 connects the CPU 2000 and graphic controller 2075, which access the RAM 2020 at a high transfer rate, to the RAM 2020. The CPU 2000 operates based on programs stored in the ROM 2010 and the RAM 2020 to control each component. The graphic controller 2075 acquires image data generated by the CPU 2000 or the like in a frame buffer provided in the RAM 2020, and displays the image on the display device 2080. Instead, the graphic controller 2075 may include therein a frame buffer for storing image data generated by the CPU 2000 or the like.

The input/output controller 2084 connects the communication interface 2030, the hard disk drive 2040, and the CD-ROM drive 2060, which are relatively high-rate input/output devices, to the host controller 2082. The communication interface 2030 communicates with another device via a network. The hard disk drive 2040 stores programs and data used by the CPU 2000 of the computer 1900. The CD-ROM drive 2060 reads out a program or data from a CD-ROM 2095, and provides it to the hard disk drive 2040 via the RAM 2020.

The ROM 2010 and relatively low-rate input/output devices such as the flexible disk drive 2050 and the input/output chip 2070 are connected to the input/output controller 2084. The ROM 2010 stores a boot program executed when the computer 1900 is activated, or programs compliant to the hardware of the computer 1900. The flexible disk drive 2050 reads out a program or data from a flexible disk 2090, and supplies it to the hard disk drive 2040 via the RAM 2020. The input/output chip 2070 is a connection interface for input/output devices of various kinds, by means of the flexible disk drive 2050, or, for example, a parallel port, a serial port, a keyboard port, a mouse port, etc.

A program to be supplied to the hard disk drive 2040 via the RAM 2020 is provided from a user in a recorded form in a recording medium such as the flexible disk 2090, the CD-ROM 2095, an IC card, and the like. The program in the recording medium is read out, installed onto the hard disk drive 2040 in the computer 1900 via the RAM 2020, and executed by the CPU 2000.

The program installed onto the computer 1900 to control the computer 1900 to function as the waveform producing section 30 includes a phase difference calculating module, a frequency calculating module, and a waveform producing module. This program or these modules act(s) on the CPU 2000 and the like to control the computer 1900 to function as the phase difference calculating section 26, the frequency calculating section 28, and the waveform producing section 30.

The program or modules described above may be stored in an external recording medium. The recording medium may be the flexible disk 2090 or the CD-ROM 2095, or alternatively, an optical recording medium such as a DVD and a CD, a magneto-optical recording medium such as an MD, a tape medium, or a semiconductor memory such as an IC card. A memory device such as a hard disk, a RAM, or the like that is installed on a server system connected to a special-purpose communication network or the Internet may be used as a recording medium, so that the program may be provided to the computer 1900 via the network.

Although one aspect of the present invention has been described by way of exemplary embodiments, the technical scope of the present invention is not limited to the scope of disclosure of the above embodiments. Various changes or alterations can be made upon the above embodiments. It is clear from the claims that embodiments including such changes or alterations can also be included in the technical scope of the present invention.

What is claimed is:

1. A waveform generating apparatus that generates an analog signal based on fundamental waveform data including a predetermined number of samples, comprising:
    a phase difference calculating section that calculates a phase difference between an initial phase and a final phase of a signal resulting from FSK-modulating, based on a predetermined first set of modulation frequencies, an input data sequence that is to be modulated onto a signal that the waveform generating apparatus generates;
    a frequency calculating section that calculates a correction frequency corresponding to a value obtained by dividing
    i) a remainder of dividing the phase difference by $2\pi$ by
    ii) the predetermined number of samples;
    a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set; and
    an output section that outputs a signal repeating the waveform represented by the fundamental waveform data.

2. The waveform generating apparatus according to claim 1, wherein the phase difference calculating section calculates the phase difference based on a value obtained by accumulating frequencies of signals resulting from FSK-modulating a plurality of data values included in the input data sequence.

3. The waveform generating apparatus according to claim 1, wherein the output section outputs the signal repeating the waveform represented by the fundamental waveform data, by modulating the signal onto a frequency obtained by adding the correction frequency to a predetermined carrier frequency.

4. A test apparatus that tests a device under test by supplying the device under test with a test signal generated based on fundamental waveform data including a predetermined number of samples, comprising:
    a phase difference calculating section that calculates a phase difference between an initial phase and a final phase of a signal resulting from FSK-modulating, based on a predetermined first set of modulation frequencies, an input data sequence that is to be modulated onto a signal supplied to the device under test;
    a frequency calculating section that calculates a correction frequency corresponding to a value obtained by dividing
    i) a remainder of dividing the phase difference by $2\pi$ by
    ii) the predetermined number of samples;
    a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set;
    an output section that outputs the test signal repeating the waveform represented by the fundamental waveform data; and
    a measuring section that measures a characteristic of the device under test based on an output signal output by the device under test in response to the test signal.

5. The test apparatus according to claim 4, wherein the measuring section acquires the output signal having a temporal duration corresponding to an integer multiple of a cycle of the waveform corresponding to the fundamental waveform data, asynchronously with the repeating waveform of the test signal, and measures the characteristic of the device under test based on the acquired output signal.

6. A waveform producing apparatus that produces fundamental waveform data that includes a predetermined number of samples, and that is a source of an analog signal to be generated by a waveform generating apparatus, the waveform producing apparatus comprising:
    a phase difference calculating section that calculates a phase difference between an initial phase and a final phase of a signal resulting from FSK-modulating, based on a predetermined first set of modulation frequencies, an input data sequence to be modulated onto a signal that the waveform generating apparatus generates;

a frequency calculating section that calculates a correction frequency corresponding to a value obtained by dividing i) a remainder of dividing the phase difference by $2\pi$ by ii) the predetermined number of samples; and a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set.

7. A non-transitory computer readable medium storing a program that controls an information processing apparatus to function as a waveform producing apparatus that produces fundamental waveform data that includes a predetermined number of samples and that is a source of an analog signal that a waveform generating apparatus generates, the program, when executed by the information processing apparatus, controlling the information processing apparatus to function as:

a phase difference calculating section that calculates a phase difference between an initial phase and a final phase of a signal resulting from FSK-modulating, based on a predetermined first set of modulation frequencies, an input data sequence to be modulated onto a signal that the waveform generating apparatus generates;

a frequency calculating section that calculates a correction frequency corresponding to a value obtained by dividing i) a remainder of dividing the phase difference by $2\pi$ by ii) the predetermined number of samples; and a waveform producing section that produces the fundamental waveform data that represents a waveform corresponding to a signal resulting from FSK-modulating the input data sequence based on a second set of modulation frequencies obtained by subtracting the correction frequency from the modulation frequencies in the first set.

* * * * *